(12) United States Patent
Ishibashi et al.

(10) Patent No.: US 9,671,177 B2
(45) Date of Patent: Jun. 6, 2017

(54) HEAT EXCHANGER, METHOD FOR FABRICATING HEAT EXCHANGER, AND AIR-CONDITIONING APPARATUS

(75) Inventors: Akira Ishibashi, Tokyo (JP); Takuya Matsuda, Tokyo (JP); Sangmu Lee, Tokyo (JP); Takashi Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 104 days.

(21) Appl. No.: 14/394,120

(22) PCT Filed: Apr. 26, 2012

(86) PCT No.: PCT/JP2012/002859
§ 371 (c)(1),
(2), (4) Date: Oct. 13, 2014

(87) PCT Pub. No.: WO2013/160951
PCT Pub. Date: Oct. 31, 2013

(65) Prior Publication Data
US 2015/0075213 A1  Mar. 19, 2015

(51) Int. Cl.
*F25B 39/02* (2006.01)
*F28F 1/12* (2006.01)
(Continued)

(52) U.S. Cl.
CPC .............. *F28F 1/12* (2013.01); *B23P 15/26* (2013.01); *F24F 1/0059* (2013.01); *F24F 1/14* (2013.01);
(Continued)

(58) Field of Classification Search
CPC .......... F28F 1/32; F28F 1/325; F28F 2225/06; F28F 2215/10; F28F 2215/12; F28F 2240/00; B23P 15/26
See application file for complete search history.

(56) References Cited

U.S. PATENT DOCUMENTS

2004/0211056 A1* 10/2004 Nakadeguchi ....... B21D 53/085
                                                       29/727
2006/0175047 A1*  8/2006 Hattori ................ B21D 53/085
                                                      165/133

(Continued)

FOREIGN PATENT DOCUMENTS

BE    695 221 A    8/1967
DE    33 02 150 A1  7/1984
(Continued)

OTHER PUBLICATIONS

Translation of FR 1480185.*
(Continued)

*Primary Examiner* — Elizabeth Martin
(74) *Attorney, Agent, or Firm* — Posz Law Group, PLC

(57) ABSTRACT

Plate-like fins have notches longer than a longitudinal axis of flat tubes that are placed in the notches. The plate-like fins also have bend portions that are located on projections projecting toward the edges more than the ends of the flat tubes, are formed by bending part of the plate-like fins, erect in a stacking direction in which the plate-like fins are stacked, and are in contact with adjacent ones of the plate-like fins. The height of the bend portions in the stacking direction is the length of a predetermined spacing.

8 Claims, 7 Drawing Sheets

(51) Int. Cl.
  *F28F 1/32* (2006.01)
  *B23P 15/26* (2006.01)
  *F24F 1/00* (2011.01)
  *F24F 1/14* (2011.01)

(52) U.S. Cl.
  CPC ............ *F28F 1/32* (2013.01); *F28F 2215/12* (2013.01); *F28F 2225/06* (2013.01); *F28F 2240/00* (2013.01); *F28F 2275/04* (2013.01); *Y10T 29/49378* (2015.01)

(56) References Cited

U.S. PATENT DOCUMENTS

| | | | | |
|---|---|---|---|---|
| 2011/0011126 | A1* | 1/2011 | Fujino | F28D 1/0477 62/513 |
| 2011/0168373 | A1* | 7/2011 | Kim | F28F 1/325 165/181 |

FOREIGN PATENT DOCUMENTS

| | | | |
|---|---|---|---|
| FR | 1480185 | A | 5/1967 |
| JP | 03-063499 | A | 3/1991 |
| JP | 03-184645 | A | 8/1991 |
| JP | 05-060482 | A | 3/1993 |
| JP | 06-050688 | A | 2/1994 |
| JP | 09-324995 | A | 12/1997 |
| JP | 11-325496 | A | 11/1999 |
| JP | 2001-165588 | A | 6/2001 |
| JP | 2002-267382 | A | 9/2002 |
| JP | 2003-214791 | A | 7/2003 |
| JP | 2008-241057 | A | 10/2008 |
| JP | 2009-281693 | A | 12/2009 |
| JP | 2010-286196 | A | 12/2010 |
| JP | 2011-064403 | A | 3/2011 |
| JP | 2012-032100 | A | 2/2012 |
| JP | 2012-032121 | A | 2/2012 |

OTHER PUBLICATIONS

Translation of DE 3302150.*
Translation of JPH0363499A.*
Translation of JP2003214791A.*
Office Action mailed May 26, 2015 issued in corresponding JP patent application No. 2014-512020 (and English translation).
Extended European Search Report dated Apr. 11, 2016 issued in corresponding EP patent application No. 12875118.7.
Office Action mailed Aug. 25, 2015 issued in corresponding JP patent application No. 2014-512020 (and English translation).
Office Action issued Jan. 8, 2016 in the corresponding CN application No. 201280073138.3 (with English translation).
International Search Report of the International Searching Authority mailed Jun. 35, 2012 for the corresponding international application No. PCT/JP2012/002859 (and English translation).
Chinese Office Action was issued on Aug. 19, 2016 in the corresponding CN application No. 201280073138.3 (English translation attached).
Office Action dated Mar. 2, 2017 issued in the corresponding CN application No. 201280073138.3 (English translation attached).

* cited by examiner (A—A)

(B—B)

INSERTION

GRAVITY DIRECTION (A-A)

(C-C)

F I G. 13
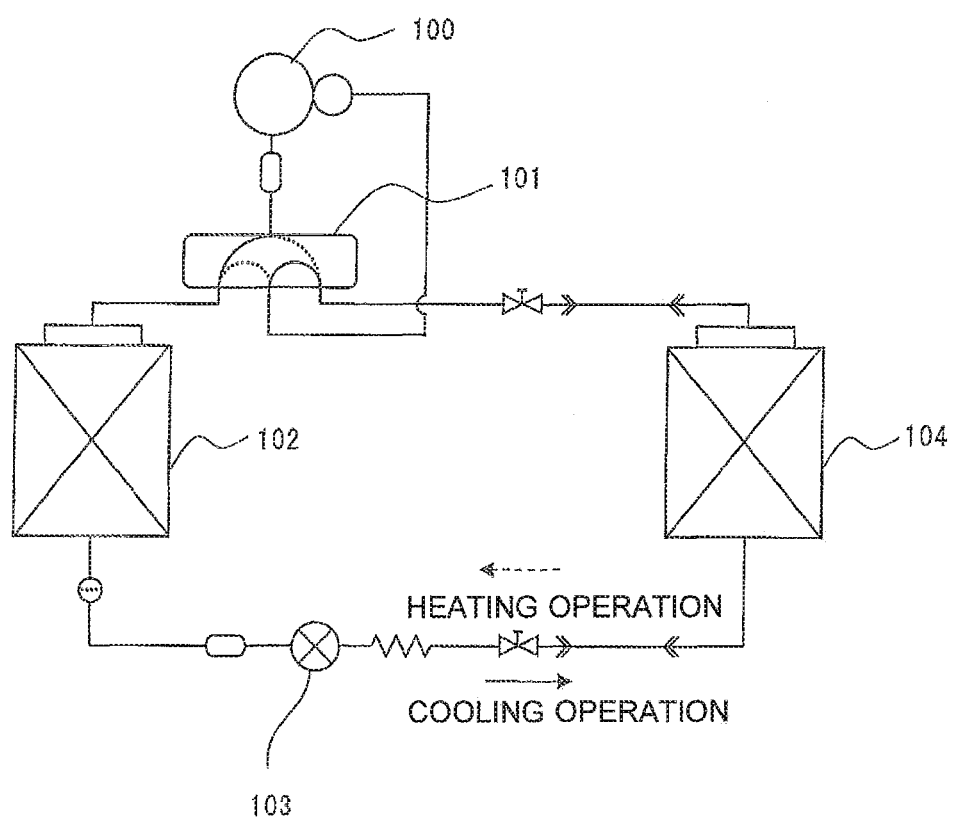

HEAT EXCHANGER, METHOD FOR FABRICATING HEAT EXCHANGER, AND AIR-CONDITIONING APPARATUS

CROSS REFERENCE TO RELATED APPLICATIONS

This application is a U.S. national stage application of PCT/JP2012/002859 filed on Apr. 26, 2012, the contents of which are incorporated herein by reference.

TECHNICAL FIELD

The present invention relates to a heat exchanger, a method for fabricating the same, and an air-conditioning apparatus using the heat exchanger.

BACKGROUND

In typical heat exchangers, when a plate-like fin and a flat heat transmission pipe are brazed together, a short-axial-length portion of a flat heat transmission pipe 2 is located downward in the direction of gravity. Thus, a brazing material 4 is fixed and is sufficiently distributed so that the heat exchanger can exhibit high heat exchange performance (see, for example, Patent Literature 1).

A heat exchanger fin in which a reflared portion that bends toward a direction opposite to the side in contact with a heat transmission pipe is formed in at least part of a tip of a fin collar and the distance between the upper surface of the reflared portion and the fin base surface is equal to a pitch between stacked fins has also been proposed (see, for example, Patent Literature 2).

PATENT LITERATURE

Patent Literature 1: Japanese Unexamined Patent Application Publication No. 2008-241057 (paragraph [0020], FIG. 8)

Patent Literature 2: Japanese Unexamined Patent Application Publication No. 2011-64403 (paragraph [0011])

In a fin-and-tube heat exchanger in which a plurality of flat tubes are inserted in stacked plate-like fins, because a rod-like brazing material is used to braze the plate-like fin and the flat tubes together, it is difficult to fix the brazing material.

In the technique of Patent Literature 1, notches in the plate-like fins are formed to be longer than the flat tubes, and the rod-like brazing materials are disposed between portions of the plate-like fins projecting toward the edges of the plate-like fins more than the ends of the flat tubes.

The portions of the plate-like fins projecting toward the edges of the plate-like fins more than the ends of the flat tubes, however, are not soldered to the flat tubes, and thus have low strength. Consequently, the fins easily fall off. In particular, in the case of disposing a plurality of rows of flat tubes and fins, adjacent fins are brought into contact with each other in, for example, a bending process, and as a result, the fins are easily deformed. Such falling off (deformation) of the fins increases the ventilation resistance of air, resulting in a decrease in heat exchange performance.

In the technique of Patent Literature 2, a reflared portion is formed at the tip of the fin collar, and the reflared portion comes into contact with an adjacent fin so that the pitch of the stacked fins is controlled.

However, in the technique with which the fin collar having a flat shape in accordance with the shape of the flat tubes is formed and the reflared portion is formed at the tip of the fin collar, there is a problem that it is difficult to perform processing. In particular, in a case where the width of the notch is shorter than the pitch of the fins, for example, in a case where the flat tubes have small diameters with small widths of the short axis, the fin collars are short, and thus, there is a problem in that it is difficult to perform processing.

SUMMARY

The present invention is made in view of the foregoing and it is therefore an object of the present invention to provide a heat exchanger that can easily allow fixing of a rod-like brazing material when the rod-like brazing materials are used for brazing plate-like fins and flat tubes, a method for fabricating the heat exchanger, and an air-conditioning apparatus employing the heat exchanger.

Further, a heat exchanger including plate-like fins with increased strength, a method for fabricating the heat exchanger, and an air-conditioning apparatus employing the heat exchanger can be provided.

Furthermore, a heat exchanger in which plate-like fins can be stacked with predetermined spacing between one another without reflare portions at the tips of fin collars, a method for fabricating the heat exchanger, and the air-conditioning apparatus employing the heat exchanger can be provided.

A heat exchanger according to the present invention includes: a plurality of plate-like fins having a plurality of notches that are open at edges of the plate-like fins, the plate-like fins being disposed with predetermined spacing between one another such that fluid flows between the plate-like fins; and a plurality of flat tubes placed in the notches of the plate-like fins and configured such that a medium to exchange heat with the fluid flows through the flat tubes, wherein the notches of the plate-like fins are longer than a longitudinal axis of the flat tubes, the plate-like fins have bend portions in projections that project toward the edges more than the ends of the flat tubes, the bend portions are formed by bending portions of the plate-like fins, erect in a stacking direction in which the plate-like fins are stacked, and are in contact with adjacent ones of the plate-like fins, and a length, in the stacking direction, of the bend portions is equal to a length of spacing between the stacked plate-like fins.

In the present invention, the projections of plate-like fins projecting toward the edges more than the ends of flat tubes has bend portions that are in contact with adjacent ones of the plate-like fins. Thus, the strength of the projections of the plate-like fin can be enhanced. In addition, the plate-like fins are stacked with predetermined spacing between one another without reflare portions at tips of fin collars.

BRIEF DESCRIPTION OF DRAWINGS

FIG. 13 illustrates a configuration of a heat exchanger according to Embodiment 4 of the present invention.

DESCRIPTION OF EMBODIMENTS

Embodiment 1

Figure 1:
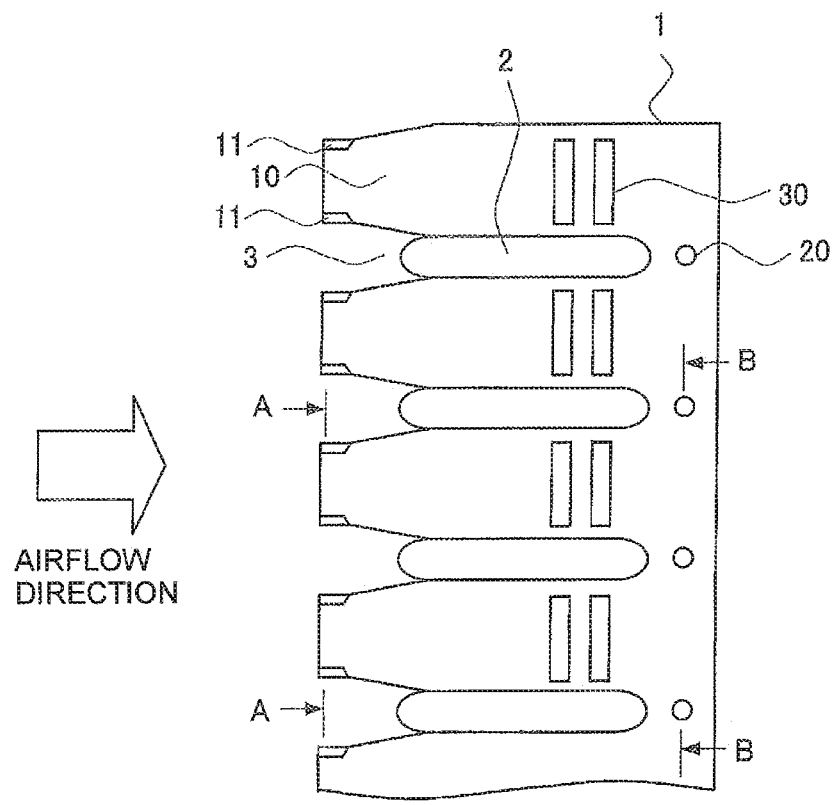
FIG. 1 illustrates a configuration of a heat exchanger according to Embodiment 1 of the present invention.
Figure 2:
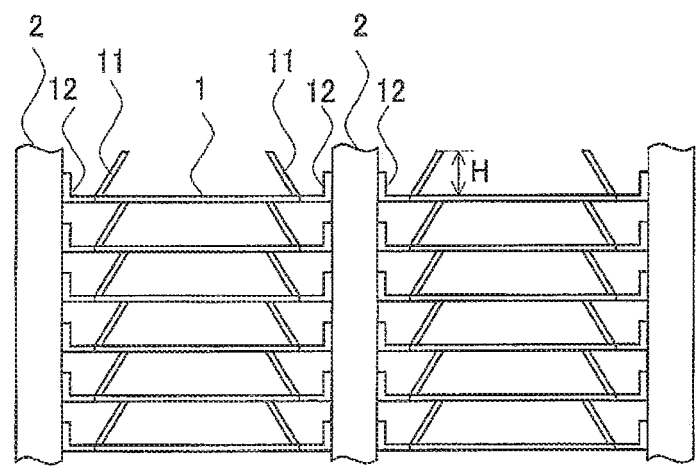
FIG. 2 shows a cross sectional view of FIG. 1 taken along a line A-A.
Figure 3:
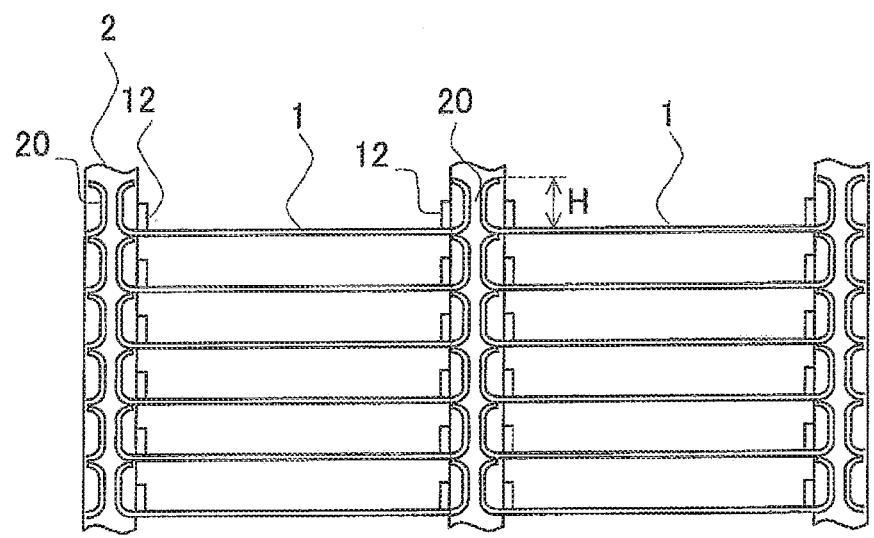
FIG. 3 shows a cross sectional view of FIG. 1 taken along a line B-B.

FIG. 1 illustrates a configuration of a heat exchanger according to Embodiment 1 of the present invention. FIG. 2 shows a cross sectional view of FIG. 1 taken along a line A-A. FIG. 3 shows a cross sectional view of FIG. 1 taken along a line B-B. FIGS. 1 to 3 schematically illustrate a main portion of the heat exchanger.

As illustrated in the drawings, the heat exchanger of Embodiment 1 includes plate-like fins 1 and flat tubes 2. The heat exchanger is installed in, for example, an air-conditioning apparatus, and exchanges heat between fluid, such as air, (hereinafter also referred to as an airflow) passing through the heat exchanger and refrigerant (medium) flowing in the flat tubes 2.

The flat tubes 2 are heat transmission pipes whose outer shapes in cross section are flat or wedge shaped. The flat tubes 2 are arranged side by side with spacing in the direction (i.e., the vertical direction in the drawing sheet) of the short axis of the flat shapes with the longitudinal axis of the flat shapes being oriented toward the direction (i.e., the lateral direction in the drawing sheet) in which fluid flows. To the ends of the flat tubes 2 are connected headers, and refrigerant is distributed among the flat tubes 2. The flat tubes 2 may be divided by partitions such that a plurality of refrigerant channels are defined.

The plate-like fins 1 have plate shapes. The plate-like fins 1 are arranged with predetermined spacing between one another, and fluid flows between the plate-like fins 1.

The plate-like fins 1 include notches 3 into which the flat tubes 2 are placed. The notches 3 are open at edges of the plate-like fins 1. The flat tubes 2 are placed in the notches 3, and the notches 3 are joined to the flat tubes 2. In Embodiment 1, the notches 3 are located at edges on the upstream side of an airflow. The present invention is not limited to this example, and the notches 3 may be located at edges on the downstream side of an airflow.

The length, in the direction in which the flat tubes 2 are inserted, of the notches 3 is larger than the length of the longitudinal axis of the flat tubes 2. When the flat tubes 2 are inserted up to the ends of the notches 3, projections 10 projecting toward the edges of the plate-like fins 1 more than the ends of the flat tubes 2 are formed in the plate-like fins 1.

The projections 10 of the plate-like fins 1 have bend portions 11 that bend so as to erect in the direction in which the plate-like fins 1 are stacked and that are in contact with the adjacent ones of the plate-like fins 1.

The bend portions 11 are formed by bending nails 13 (see FIG. 6) that extend toward adjacent ones of the projections 10 from part of the peripheries of the notches 3 in the projections 10.

The bend portions 11 are formed such that the bending lines are substantially parallel with the longitudinal axis of the flat tubes 2. In this manner, an increase in the ventilation resistance of the bend portions 11 can be reduced.

As illustrated in FIG. 2, the length (height) of the bend portions 11 in the stacking direction is a pitch spacing H between the plate-like fins 1. In this manner, each of the bend portions 11 is in contact with an adjacent one of the plate-like fins 1, thereby easily maintaining a predetermined spacing between the stacked plate-like fins 1.

In addition, fin collars 12 substantially perpendicularly extend from at least part of the rims of the notches 3 in the plate-like fins 1 so that the plate-like fins 1 are in close contact with the flat tubes 2. The length (height) of the fin collars 12 can be made smaller than the pitch spacing H between the plate-like fins 1.

The plate-like fins 1 have burrings 20 that are located downstream of the notches 3, project in the stacking direction of the plate-like fins 1, and are in contact with adjacent ones of the plate-like fins 1. In Embodiment 1, the burrings 20 are located downstream of the notches 3. The present invention is not limited to this example, and the burrings 20 may be located at any position.

As illustrated in FIG. 3, the length (height) of the burrings 20 in the stacking direction is equal to the pitch spacing H between the plate-like fins 1. Thus, the burrings 20 are in contact with adjacent ones of the plate-like fins 1, and predetermined spacings can be easily maintained between the stacked plate-like fins 1.

Figure 4:
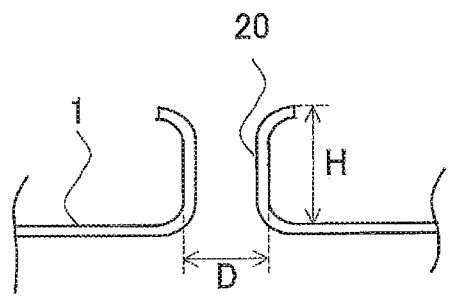
FIG. 4 is an enlarged view illustrating a burring of Embodiment 1.

FIG. 4 is an enlarged view illustrating a burring of Embodiment 1.

As illustrated in FIGS. 3 and 4, the opening width D of the burrings 20 is smaller than the length of the short axis of the flat tubes 2. Since the burrings 20 are located downstream of the notches 3 of the plate-like fins 1 and the opening width D is smaller than the length of the short axis of the flat tubes 2, the projections of the burrings 20 can be located in a dead water region (a velocity defect region occurring in wake portions of the flat tubes 2) generated downstream of the flat tubes 2, thereby reducing an increase in the ventilation resistance of the burrings 20.

In addition, slits 30 may be formed by cutting and raising part of the plate-like fins 1. Such slits 30 allow a thermal boundary layer to be formed due to a leading edge effect, and thus, heat exchange between the plate-like fins 1 and an airflow can be promoted.

As described above, in Embodiment 1, the plate-like fins 1 are formed such that the notches 3 are longer than the longitudinal axis of the flat tubes 2 and the bend portions 11 are provided on the projections 10 projecting toward the edges of the flat tubes 2 more than the ends of the flat tubes 2.

This configuration can enhance the strength of the projections 10 of the plate-like fins 1. Thus, even in a case where the plate-like fins 1 easily fall off in a bending process (e.g., L bending) of the heat exchanger, the likelihood of the fins falling off can be reduced, and an increase in the ventilation resistance of an airflow caused by such falling off can be reduced. As a result, deterioration of heat exchange performance can be reduced.

The length of the bend portions 11 in the stacking direction is equal to the height of the predetermined pitch spacing H, and the bend portions 11 are in contact with adjacent ones of the plate-like fins 1.

Thus, the plate-like fins 1 can be stacked with predetermined pitch spacings H without reflares at the tips of the fin collars 12.

In Embodiment 1, the plate-like fins 1 include the burrings 20 that project in the stacking direction of the plate-like fins 1 and are in contact with adjacent ones of the plate-like fins 1.

Thus, the plate-like fins 1 can be stacked with predetermined pitch spacings H without reflares at the tips of the fin collars 12.

In Embodiment 1, the bend portions 11 and the burrings 20 are provided. The present invention is not limited to this example, and the burrings 20 may be omitted. In such a configuration, the strength of the projections 10 of the plate-like fins 1 can also be enhanced, and the plate-like fins 1 can be stacked with predetermined pitch spacings H without reflares at the tips of the fin collars 12.

Figure 5:
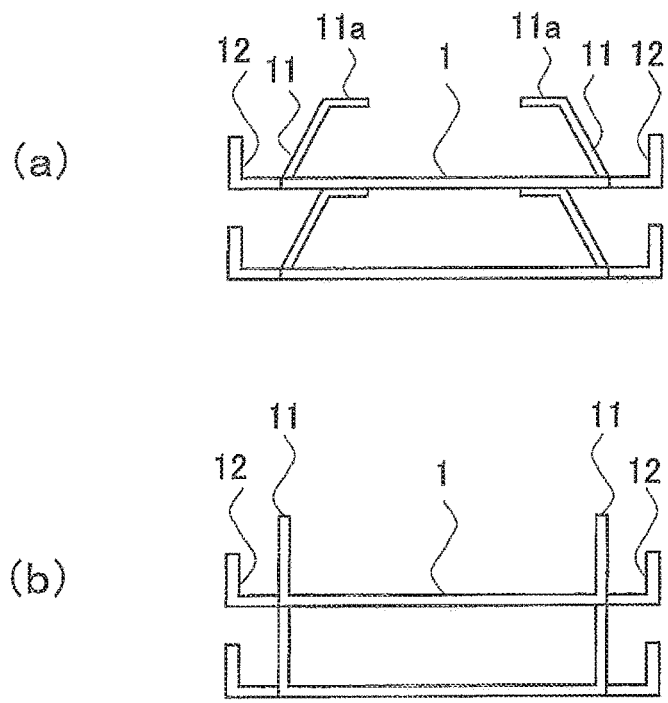
FIG. 5 illustrates other shapes of a bend portion of Embodiment 1.

The shape of the bend portions 11 is not limited to that illustrated in FIGS. 1 and 2. For example, as illustrated in FIG. 5(a), tips 11a of the bend portions 11 may be bent so as to be parallel with the contact portions of adjacent ones of the plate-like fins 1. In this manner, the area of portions of the bend portions 11 in contact with adjacent ones of the plate-like fins 1 can be increased, and as a result, the plate-like fins 1 can be stacked more stably.

As illustrated in FIG. 5(b), for example, the bend portions 11 may erect substantially perpendicularly, for example. Then, processing for forming the bend portions 11 by bending nails 13 (which will be described later) can be easily performed.

A fabrication process of the heat exchanger of Embodiment 1 will now be described.

Figure 6:
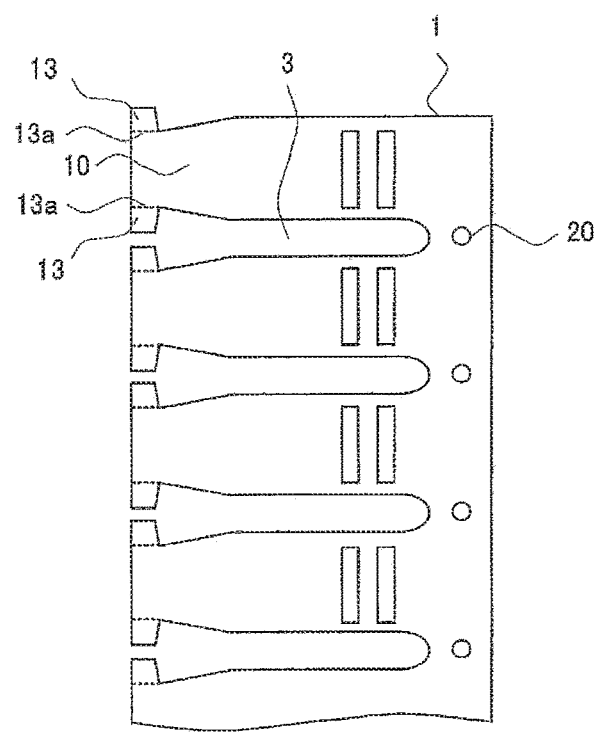
FIG. 6 illustrates a fabrication process of a heat exchanger according to Embodiment 1.
Figure 7:
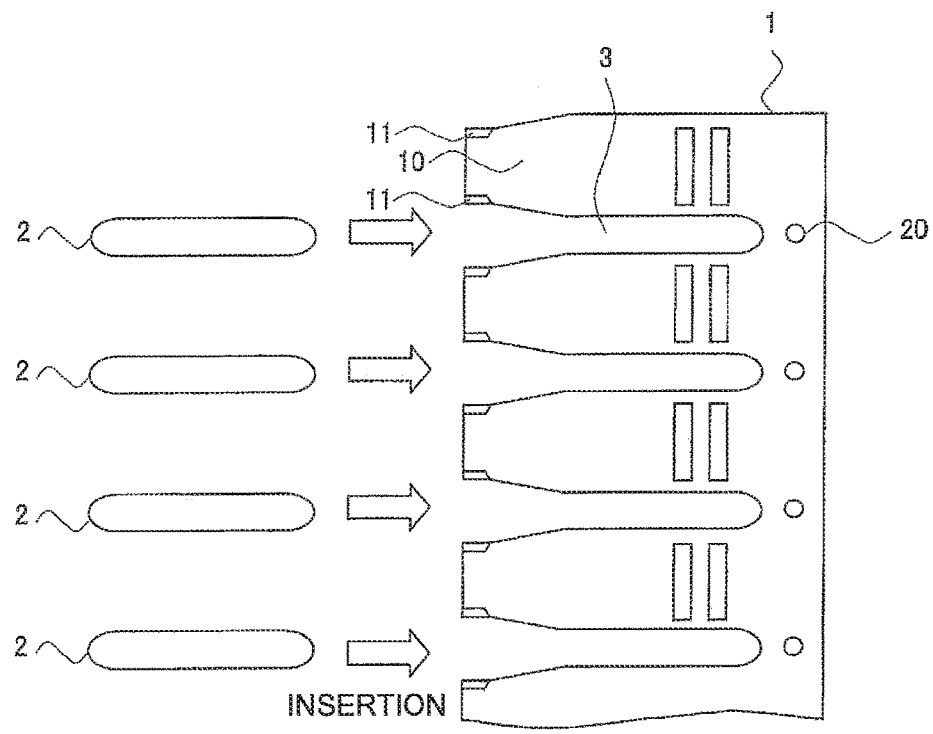
FIG. 7 illustrates the fabrication process of a heat exchanger according to Embodiment 1.
Figure 8:
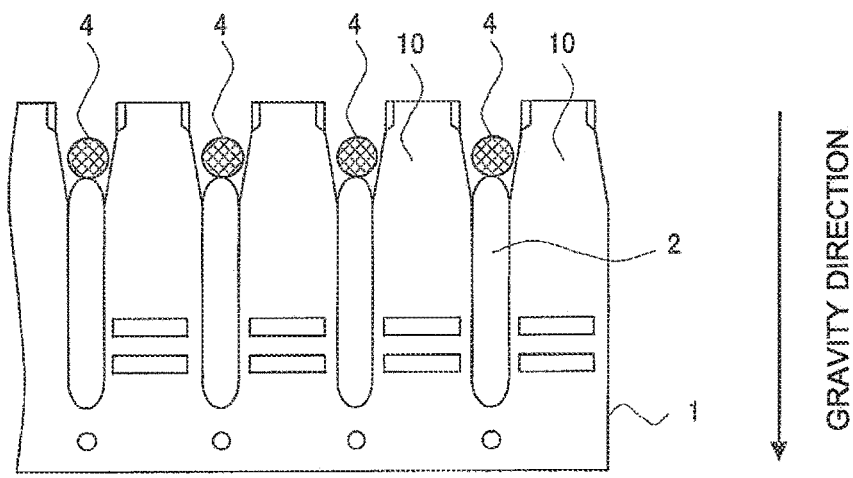
FIG. 8 illustrates the fabrication process of a heat exchanger according to Embodiment 1.

FIGS. 6 to 8 illustrate process steps of fabricating a heat exchanger according to Embodiment 1. In the drawings, a main portion of the heat exchanger is schematically shown.

First, a fin cutout process of shaping plate-like fins 1 is performed. In this process, as illustrated in FIG. 6, notches 3, nails 13 extending toward adjacent projections 10 from part of the rims of the notches 3 in the projections 10, and burrings 20 are formed in the plate-like fins 1 with, for example, a mold pressing machine. Slits 30 may be formed when necessary.

The nails 13 of the plate-like fins 1 are bent, thereby forming bend portions 11. In this process, as illustrated in FIG. 6, the nails 13 are bent such that bending lines 13a for use in bending the nails 13 are substantially parallel with the direction (i.e., the airflow direction) of the longitudinal axis of the flat tubes 2.

Then, the resulting plate-like fins 1 are stacked, and the bend portions 11 and the burrings 20 are brought into contact with adjacent ones of the plate-like fins 1, thereby performing a process of maintaining a predetermined pitch spacing H.

Thereafter, as illustrated in FIG. 7, a process of inserting flat tubes 2 into the notches 3 of the stacked plate-like fins 1 is performed.

Subsequently, as illustrated in FIG. 8, the opening of the notches 3 are oriented upward in the direction of gravity, and a process of disposing rod-like brazing materials 4 above the flat tubes 2 is performed. In this manner, the brazing materials 4 are fixed between the projections 10 of the plate-like fins 1.

Then, a process of brazing the plate-like fins 1 and the flat tubes 2 together is performed. In this process, the plate-like fins 1 provided with the brazing materials 4 and the flat tubes 2, for example, are placed in a nocolok continuous furnace so that the plate-like fins 1 and the flat tubes 2 are joined together with heat. A hydrophilic treatment coating material may be applied onto the surfaces of the plate-like fins 1.

In the foregoing manner, the plate-like fins 1 having the above-described shapes are stacked, and the bend portions 11 are brought into contact with adjacent ones of the plate-like fins 1. Thus, a predetermined spacing H between the stacked plate-like fins 1 can be easily maintained. The flat tubes 2 can be inserted into the stacked plate-like fins 1.

In addition, since the brazing materials 4 are fixed between the projections 10 of the plate-like fins 1, detachment of the brazing materials 4 can be reduced. For example, it is possible to reduce the possibility of detachment of the brazing materials 4 in the furnace. Thus, in using the rod-like brazing materials 4 in order to braze the plate-like fins 1 and the flat tubes 2 together, the brazing materials 4 can be easily fixed.

Further, as compared to cladding fins in which both sides or a single side of each of the plate-like fins 1 is clad with a brazing material beforehand, the clearance between the plate-like fins 1 and the flat tubes 2 can be sufficiently filled with the rod-like brazing materials 4, and thus, heat transmission performance can be enhanced. As a result, the heat exchanger with high heat exchange performance can be fabricated easily.

Embodiment 2

Figure 9:
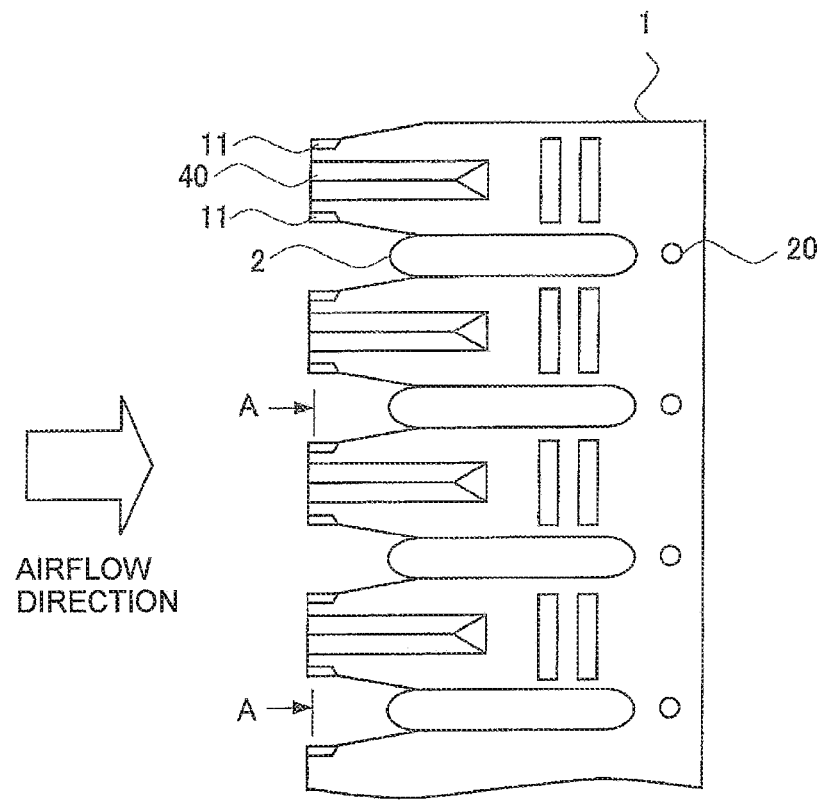
FIG. 9 illustrates a configuration of a heat exchanger according to Embodiment 2 of the present invention.
Figure 10:
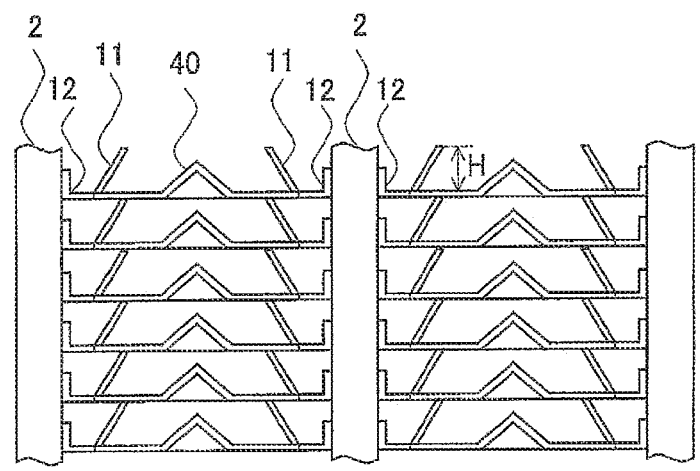
FIG. 10 shows a cross sectional view of FIG. 9 taken along a line A-A.

FIG. 9 illustrates a configuration of a heat exchanger according to Embodiment 2 of the present invention. FIG. 10 illustrates a cross sectional view of FIG. 9 taken along a line A-A. FIGS. 9 and 10 schematically illustrate a main portion of the heat exchanger.

As illustrated in FIGS. 9 and 10, plate-like fins 1 according to Embodiment 2 have ribs 40 on projections 10. The ribs 40 have ridge shapes formed by bending part of the plate-like fins 1 and projecting in the stacking direction of the plate-like fins 1 in cross section. The ridges of the ribs 40 are substantially parallel with the longitudinal axis of the flat tubes 2. The ribs 40 extend from the projections 10 to portions between adjacent ones of the flat tubes 2.

The other parts of the configuration are similar to the configuration of Embodiment 1, and the same components are designated by the same reference characters.

In Embodiment 2, the ribs 40 are triangular in cross section. The present invention is not limited to this shape. For example, the ribs 40 may be semicircular or trapezoidal in cross section.

Such ribs 40 can further increase the strength of the projections 10 of the plate-like fins 1. In addition, since the ribs 40 are formed such that the ridges of the ribs 40 are substantially parallel with the longitudinal axis of the flat tubes 2, an increase in the ventilation resistance of the ribs 40 can be reduced.

Embodiment 3

Figure 11:
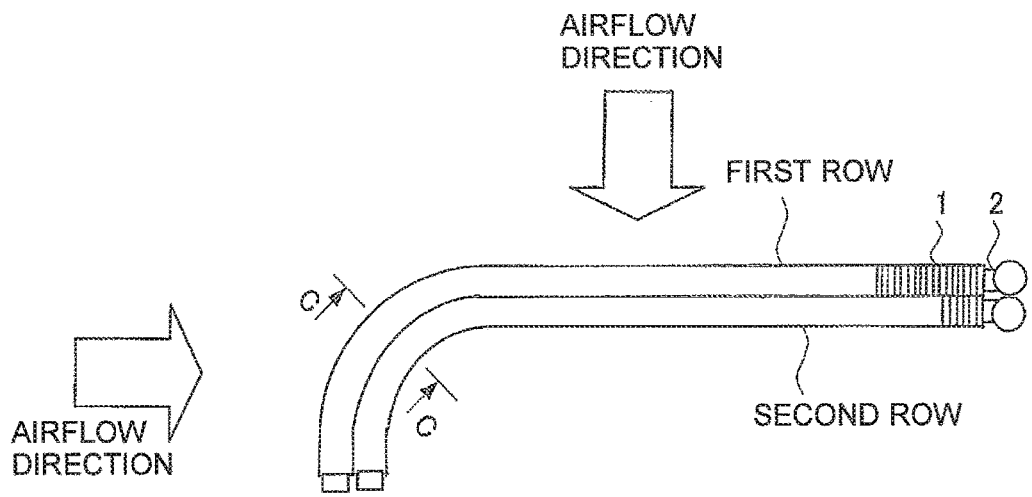
FIG. 11 illustrates a configuration of a heat exchanger according to Embodiment 3 of the present invention.
Figure 12:
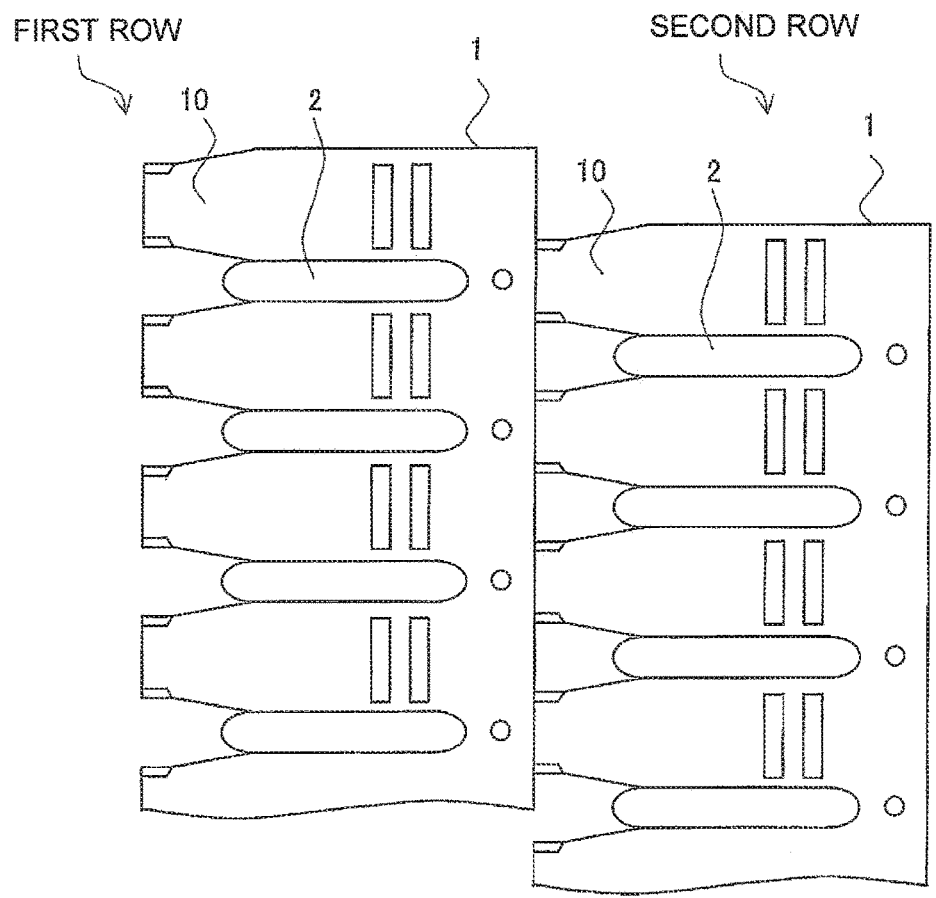
FIG. 12 shows a cross sectional view of FIG. 11 taken along a line C-C.

FIG. 11 illustrates a configuration of a heat exchanger according to Embodiment 3. FIG. 12 illustrates a cross sectional view of FIG. 11 taken along a line C-C. FIGS. 11 and 12 schematically illustrate a main portion of the heat exchanger.

As illustrated in FIG. 11, in the heat exchanger of Embodiment 3, plate-like fins 1 and flat tubes 2 are provided in two rows along a flow direction of an airflow.

In the heat exchanger of Embodiment 3, at least part of the flat tubes 2 in the longitudinal direction is subjected to a bending process (e.g., L bending).

The other parts of the configuration are similar to the configurations of Embodiments 1 and 2, and the same components are designated by the same reference characters.

In Embodiment 3, two rows of the plate-like fins 1 and the flat tubes 2 are provided. The present invention is not limited to this example, and any number of rows may be provided.

As illustrated in FIG. 12, in a case where a plurality of rows of the plate-like fins 1 and the flat tubes 2 are provided, the downstream end of the plate-like fin 1 in the first row is adjacent to the projection 10 of the plate-like fin 1 in the second row.

In such a configuration, a bending process can ease deformation of the projections 10 of the plate-like fins 1.

Since the projections 10 of the plate-like fins 1 of Embodiment 3 include bend portions 11 as described above, even in a case where plate-like fins 1 easily fall off in a bending process (e.g., L bending) of the heat exchanger, the likelihood of the plate-like fins 1 falling off in such a manner can be reduced and an increase in the ventilation resistance of an airflow due to falling off of the fins can be reduced. As a result, deterioration of heat exchange performance can be reduced.

Embodiment 4

In Embodiment 4, an air-conditioning apparatus including the heat exchanger of one of Embodiments 1 to 3 will be described.

FIG. 13 illustrates a configuration of the air-conditioning apparatus of Embodiment 4.

As illustrated in FIG. 13, the air-conditioning apparatus includes a refrigerant circuit in which a compressor 100, a four-way valve 101, an outdoor-side heat exchanger 102 provided in an outdoor unit, an expansion valve 103 serving as an expansion means, and an indoor-side heat exchanger 104 provided in an indoor unit are connected to in series with refrigerant pipes and refrigerant is circulated.

The four-way valve 101 switches operation between heating operation and cooling operation by switching a direction in which refrigerant flows in the refrigerant circuit. In the case of an air-conditioning apparatus dedicated for cooling or heating, the four-way valve 101 may be omitted.

The outdoor-side heat exchanger 102 corresponds to one of the heat exchangers of Embodiments 1 to 3 described above, serves as a condenser that heats air, for example, by using heat from refrigerant in cooling operation, and serves as an evaporator that causes refrigerant to evaporate so as to cool air, for example, by using the heat of vaporization in a heating operation.

The indoor-side heat exchanger 104 corresponds to one of the heat exchangers of Embodiments 1 to 3 described above, serves as an evaporator of a refrigerant in a cooling operation, and serves as a condenser of a refrigerant in a heating operation.

The compressor 100 compresses a refrigerant from the evaporator, and supplies the refrigerant at an increased temperature to the condenser.

The expansion valve 103 causes a refrigerant from the condenser to expand, and supplies the refrigerant at a reduced temperature to the evaporator.

The heat exchanger may be used for at least one of the outdoor-side heat exchanger 102 and the indoor-side heat exchanger 104.

In Embodiment 4, in a case where the heat exchanger serves as an evaporator, a refrigerant at a low temperature (e.g., 0 degrees C. or less) flows in the flat tubes 2. At this time, moisture (steam) in the air passing between the plate-like fins 1 is condensed and attaches as frost (frost accumulation).

As described above, notches 3 in the plate-like fins 1 are located upstream in an airflow direction, and the projections 10 are located upstream of the flat tubes 2 in the airflow direction. Thus, in an upstream region where the absolute humidity in the air is high and frost accumulation easily occurs, the projections 10 cause part of moisture in the air to be accumulated as frost. In addition, the air whose absolute humidity has decreased due to frost accumulation on the projections 10 passes between the flat tubes 2, and thus, the amount of frost accumulated between the flat tubes 2 can be reduced, as compared to a case where no projections 10 are provided. Thus, the moisture in the air passing between the stacked plate-like fins 1 is distributed between the projections 10 and the flat tubes 2 and accumulated as frost. Thus, an increase in the ventilation resistance between the plate-like fins 1 due to frost accumulation can be reduced, and as a result, resistance to frost accumulation can be enhanced.

The invention claimed is:

1. A heat exchanger comprising:
a plurality of plate-like fins having a plurality of notches that are open at edges of the plate-like fins and openings being separate from the notches, the plate-like fins being stacked with a spacing between adjacent plate-like fins sufficient for a fluid to flow between the adjacent plate-like fins; and
a plurality of flat tubes placed in the notches of the plate-like fins and configured to exchange heat with a heat-exchange medium flowing through the flat tubes, wherein
the notches of the plate-like fins are longer than a longitudinal axis of the flat tubes,
the plate-like fins have projections including bend portions that project toward the edges more than the ends of the flat tubes,
the bend portions extend in a stacking direction in which the plate-like fins are stacked and contact an adjacent stacked plate-like fin,
a length of the bend portions in the stacking direction is equal to a length of the spacing between the adjacent plate-like fins,
fin collars substantially perpendicularly extend from at least part of rims of the notches,
a length of the fin collars in the stacking direction is smaller than the length of the spacing between the adjacent plate-like fins,
the plate-like fins include burring on edges of the openings, the burrings projecting annularly in the stacking direction of the plate-like fins and contacting an adjacent plate-like fin, and
a length of the burrings in the stacking direction is equal to the length of the spacing between the adjacent plate-like fins.

2. The heat exchanger of claim 1, wherein
the plate-like fins include nails located on parts of the rims of the notches in the projections, extending toward adjacent ones of the projections, and bent so as to constitute the bend portions, and
bending lines of the bend portions are substantially parallel with the longitudinal axis of the flat tubes.

3. The heat exchanger of claim 1, wherein
the notches of the plate-like fins are located at the edges on the plate-like fins at an upstream side, an opening width of the openings is smaller than a length of short axis of the flat tubes, and the burrings are located downstream of the notches.

4. The heat exchanger of claim 1 wherein the plate-like fins include ribs that have chevron-shaped cross sections projecting that project in the stacking direction of the plate-like fins, and ridges of the chevron-shapes are substantially parallel with the longitudinal axis of the flat tubes.

5. The heat exchanger of claim 4, wherein the ribs of the plate-like fins extend to portions between adjacent ones of the flat tubes.

6. The heat exchanger of claim 1, wherein the plate-like fins and the flat tubes are provided in a plurality of rows in a direction in which the fluid flows.

7. A method for fabricating a heat exchanger including a plurality of plate-like fins and a plurality of flat tubes, the method comprising:

forming a plurality of notches in each of the plate-like fins, each of notches being formed to open at edges of the plate-like fins and to be longer than a longitudinal axis of the flat tubes;

bending a part of rims of the notches in the plate-like fins and forming bent portions;

forming openings in each of the plate-like fins, each of the openings being formed with burrings extending annularly from edges of each of the openings;

stacking the plurality of the plate-like fins with the bent portions and the burrings being in contact with adjacent ones of the plate-like fins, and maintaining the spacing between the plate-like fins;

inserting the flat tubes in the plurality of notches of the plurality of the plate-like fins that are stacked with the spacing between one another;

disposing rod-like brazing materials above the flat tubes with openings of the notches being opened upward in a direction of gravity; and brazing the plate-like fins and the flat tubes together.

8. An air-conditioning apparatus comprising:

a refrigerant circuit in which a compressor, a condenser, an expansion unit, and an evaporator are connected in sequence with pipes such that refrigerant circulates, wherein the heat exchanger of claim 1 is used for at least one of the condenser and the evaporator.

\* \* \* \* \*